United States Patent Office 2,728,788
Patented Dec. 27, 1955

2,728,788

PROCESS FOR PREPARING AROMATIC SULFONIC ESTERS OF BRANCHED CHAIN ALIPHATIC ALCOHOLS

William R. Waldron and Richard C. Franklin, Wilmington, Del., assignors to E. I. du Pont de Nemours & Company, Wilmington, Del., a corporation of Delaware No Drawing. Application January 28, 1953,
Serial No. 333,836

8 Claims. (Cl. 260—456)

This invention relates to an improved process for preparing aromatic sulfonic esters of branched chain aliphatic alcohols which are particularly useful as alkylating agents in the manufacture of dyes.

In general, the aromatic sulfonic esters of straight chain aliphatic alcohols are prepared by reacting the aromatic sulfonyl chloride with the alcohol in the presence of potassium hydroxide. With the normal aliphatic alcohols this process has proved satisfactory and gives reasonably good results; however, when applied to secondary or tertiary alcohols the yields of the resulting aromatic sulfonic ester of the branched chain alcohols is very low, usually in the order of from 30% to 50%.

It is therefore an object of this invention to provide a process for preparing aromatic sulfonic esters of branched chain alcohols by a process which will give substantially increased yields of a relatively pure product as compared with the prior art processes.

The process of our invention comprises reacting the aromatic sulfonyl chloride with a sodium alkoxide of the branched chain alcohol at from 10° to 30° C. in the presence of a diluent which may be an excess of the alcohol or a water immiscible organic solvent in which the sulfonic ester of the branched chain alcohol is soluble. By this process yields of the desired aromatic sulfonic esters of branched chain alcohols are obtained in from 70% to 85% of theory, based on the aromatic sulfonyl chloride employed.

The sodium alkoxide is prepared by adding metallic sodium to the anhydrous alcohol, preferably under nitrogen atmosphere while the temperature is held below 65° C. This temperature may be maintained by controlling the rate of addition of the sodium. To complete the reaction, the alcohol solution of the sodium alkoxide and sodium is heated to reflux. Where a minimum amount of excess alcohol is desired, an organic solvent in which the sulfonic ester of the branched chain alcohol is soluble may be added as a diluent to render the thick, viscous mixture more fluid. The mixture is then cooled to around 12° C. and the desired aromatic sulfonyl chloride is gradually added while the temperature is maintained at from 10° to 20° C. The aromatic sulfonic ester is formed immediately, together with sodium chloride as a by-product. The resulting mass is then drowned in water and separated by decantation. The water insoluble ortho-dichlorobenzene solution of the aromatic sulfonic ester is then washed with water and again separated by decantation. This solution of the aromatic sulfonic ester is then used directly in alkylation processes where the alkylation is to be carried out in an organic solvent.

The following examples are given to illustrate the invention. The parts used are by weight.

Example 1

To 1,440 parts of anhydrous isopropyl alcohol are added, with good agitation under an atmosphere of nitrogen, 118 parts of metallic sodium cut in small pieces. The rate of addition of the sodium is such that the temperature of the reaction mass does not exceed 65° C. When addition of the sodium is complete, the mixture is heated to from 80° to 83° C. and held under reflux for 2 hours or until all traces of free sodium have disappeared. The resulting alcoholic solution, containing 420 parts of sodium isopropoxide, is diluted with 3,600 parts of ortho-dichlorobenzene with rapid agitation.

The mixture is cooled to 12° C. and 647 parts of para-toluene sulfonyl chloride are added at such a rate that the temperature of the reaction mass remains in the interval from 10° C. to 20° C. When the addition of the sulfonyl chloride is complete, the mass is agitated ½ hour to 1 hour to complete the reaction.

When esterification is complete, carbon dioxide gas is bubbled through the reaction mass until it is neutral to moist phenolphthalein test paper. Then to the reaction mixture are gradually added 500 parts of water.

The organic layer is separated and washed by decantation with water until the washings are no longer alkaline to phenolphthalein.

The product is obtained as a solution of the sulfonic ester in ortho-dichlorobenzene and may be used without further treatment in alkylation reactions in which an organic solvent reaction medium is employed.

The yield is 577 parts of isopropyl para-toluene sulfonate, 79% of the theoretical yield based on para-toluene sulfonyl chloride.

Example 2

The reaction is carried out as described in Example 1, using 5,040 parts of isopropyl alcohol in place of additional solvent. The pure isopropyl-p-toluene sulfonate is then isolated by drowning in water to remove the excess alcohol. A 72.3% yield of 96.3% product is thus obtained.

Example 3

Following the procedure given for the sodium isopropoxide given in Example 1, 492 parts of sodium sec. butoxide are prepared from 1,770 parts of secondary butyl alcohol and 118 parts of sodium, finishing the reaction at from 90° to 95° C. The resulting secondary butoxide solution is diluted with 3,600 parts of ortho-dichlorobenzene in the manner of Example 1. The solution is cooled to 12° C. and 647 parts of para-toluene sulfonyl chloride are added at such a rate that the temperature of the reaction mass remains at from 10° to 20° C.

When reaction is complete, the mass is neutralized with carbon dioxide gas as in Example 1, and washed alkali-free by repeated decantation with water. The yield of sec. butyl para-toluene sulfonate is 566 parts, 73% of the theoretical yield, as a solution in ortho-dichlorobenzene.

Example 4

Isopropyl benzene sulfonate is prepared in the same manner as isopropyl para-toluene sulfonate (see Example 1), except that 600 parts of benzene sulfonyl chloride are used in place of the 647 parts of para-toluene sulfonyl chloride. All other conditions remain unchanged. The yield is 550 parts of isopropyl benzene sulfonate in ortho-dichlorobenzene solution, 88% of the theoretical yield.

The process described above and illustrated in the specific examples is not limited to the particular aromatic sulfonyl chlorides or alcohols mentioned, but may be used in the preparation of aromatic sulfonic esters of branched chain alcohols (secondary and tertiary alcohols). Tertiary-butyl alcohol, isoamyl alcohol, 2-pentanol and other secondary or tertiary alcohols containing from 3 to 6 carbon atoms may obviously be employed in this process.

Other organic solvents than the ortho-dichlorobenzene, such as benzene, mono-chlorobenzene, isomeric dichlorobenzenes, nitrobenzene, toluene, xylene, etc., may be used. The purpose of the diluent is to permit easy agitation of the pasty sodium alkoxide. It may also serve as a solvent for the final product, particularly where the product is to be used in a solvent for subsequent reactions.

The alcohols employed in making the sodium alcoholates should be anhydrous to avoid the use of unnecessary amounts of metallic sodium and to eliminate as far as possible the presence of sodium hydroxide in the alcoholate solution.

Aqueous solutions of other mineral acids may be employed as a substitute for the carbon dioxide gas in neutralizing the excess sodium hydroxide that may be formed or present in the reaction.

The use of the sodium alkoxides in place of the alcoholic solution of potassium hydroxide gives surprising results when working with the branched chain alcohols, for it has been found that where the sodium alkoxides of normal alcohols are used in preparing the straight chain esters, no improved yield is obtained, whereas the yield in the preparation of the sulfonic ester of isopropyl alcohol is increased from 50% to 79% by using the sodium alkoxide as distinguished from the alcoholic solution of potassium hydroxide. Similar improvements in yield result with the use of the other secondary and tertiary sodium alkoxides.

We claim:

1. A process for preparing aromatic sulfonic esters of branched chain alcohols of the group consisting of secondary and tertiary alcohols containing from 3 to 6 carbon atoms, which comprises reacting the sodium alkoxide of the branched chain alcohol with an aromatic sulfonyl chloride in an organic diluent at temperatures of from 10° to 30° C.

2. A process for preparing aromatic sulfonic esters of branched chain alcohols of the group consisting of secondary and tertiary alcohols containing from 3 to 6 carbon atoms, which comprises reacting the alcohol with sodium to form the sodium alkoxide, diluting the reaction mass with a water immiscible organic solvent in which the aromatic sulfonic esters of branched chain alcohol is soluble, adding the aromatic sulfonyl chloride at a temperature of from 10° to 30° C., and separating the organic solvent solution of the aromatic sulfonic esters of the branched chain alcohol from the aqueous solution.

3. A process for preparing aromatic sulfonic esters of secondary alcohols which comprises reacting the sodium alkoxide of the secondary alcohol with an aromatic sulfonyl chloride in an organic diluent at temperatures of from 10° to 30° C.

4. A process for preparing p-toluene sulfonic esters of secondary alcohols which comprises reacting the sodium alkoxide of the secondary alcohol with p-toluene sulfonyl chloride in an organic diluent at temperatures of from 10° to 30° C.

5. A process for preparing p-toluene sulfonic esters of tertiary alcohols which comprises reacting the sodium alkoxide of the tertiary alcohol with p-toluene sulfonyl chloride in an organic diluent at temperatures of from 10° to 30° C.

6. A process for preparing isopropyl-p-toluene sulfonate which comprises reacting the sodium alkoxide of the isopropyl alcohol with p-toluene sulfonyl chloride in an organic diluent at temperatures of from 10° to 30° C.

7. A process for preparing secondary butyl-p-toluene sulfonate which comprises reacting the sodium alkoxide of secondary butyl alcohol with p-toluene sulfonyl chloride in an organic diluent at temperatures of from 10° to 30° C.

8. A process for preparing isopropyl benzene sulfonate which comprises reacting the sodium alkoxide of isopropyl alcohol with benzene sulfonyl chloride in an organic diluent at temperatures of from 10° to 30° C.

References Cited in the file of this patent

UNITED STATES PATENTS 2,348,705   Alderman et al. _____ May 16, 1944